Patented Jan. 31, 1950

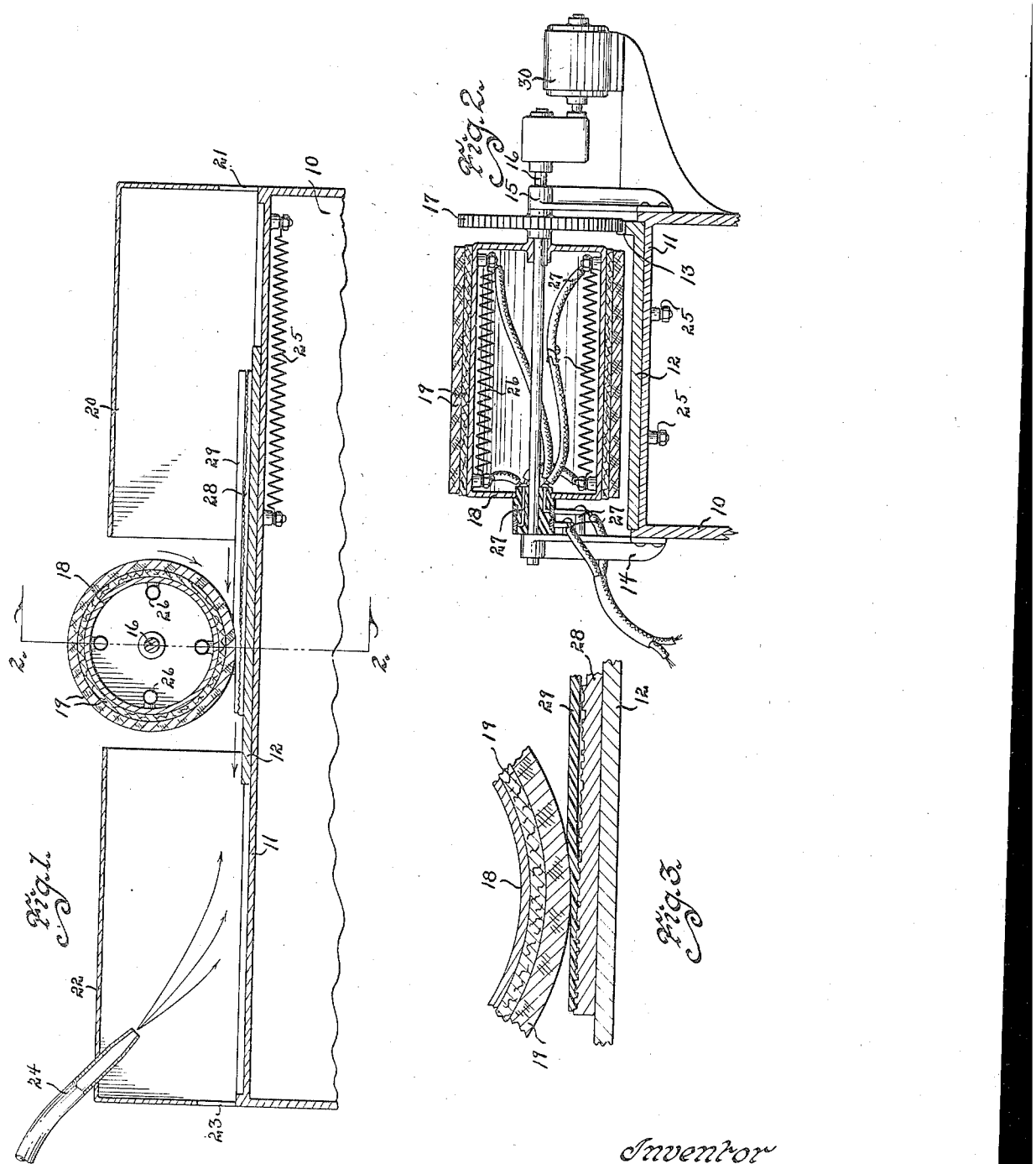

2,496,014

UNITED STATES PATENT OFFICE 2,496,014

APPARATUS FOR FORMING THERMOPLASTIC MOLDS FOR USE IN ELECTROTYPING

Robert R. Myers, Des Moines, Iowa

Application May 11, 1946, Serial No. 669,091

3 Claims. (Cl. 18—4)

My invention relates particularly to electrotyping wherein duplicate printing plates are formed by heating and forcing a thermoplastic sheet onto printing plate or type indicia to form a matrix or mold, rendering the same electroconductive, then electroplating the same to produce a shell-like replica of the original, and lastly, the backing or filling out of the shell with a softer metal to the desired thickness.

More specifically, the object of this invention is to provide a heated roller press and carriage for forcing heated plastic material onto a printing plate to form a mold or case, thereby providing equipment for this purpose that is economical in manufacture, durable in use, and substantially automatic in its operation.

This and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of my device in operation.

Fig. 2 is a cross-sectional view of the device taken on line 2—2 of Fig. 1, and more fully illustrates its construction.

Fig. 3 is an enlarged side-sectional view of a portion of my device showing the heated roller forcing the plastic sheet onto an original printing plate pattern.

In the manufacture of electrotype duplicates from original patterns, such as type forms, photoengravings, and other printing surfaces or combinations thereof, there are three methods, i. e. the use of wax, the use of sheet lead as a molding medium, and the relatively recent employment of thermoplastic material. The most common system is the use of wax. In this method a wax plate is formed by flowing a special melted wax such as "ozokerite" upon a metal backing plate and shaving the wax to produce a smooth surface. The wax case and the original printing pattern are then brushed with graphite powder to prevent sticking, after which the pattern is brought in contact with the wax and pressed by hydraulic means to form the impressions in the wax. After the wax case has been removed from the pattern, graphite is again applied to the wax to render the impressed surface electro-conductive in order that a metal replica of the original pattern can be formed subsequently on the wax by electro-deposition.

The wax method has many disadvantages. After the wax case has been molded it is necessary to trim protruding or excess wax which has been displaced in the molding operation and forced into deep grooves or between lines and characters of the pattern design impressed in the case. Likewise, wax must be added to the low portions of the matrix. After this operation, a gas flame is passed over the matrix in order to smooth over the rough edges. These three wax operations known in the art as "cutting down," "building up," and "flashing" require much skill and require a great deal of labor and time. Another disadvantage of the wax method is the objectionable use of graphite, which floats in the air, filling the entire factory with graphite dust and settling on machinery, causing electrical shorts in motors and generators. Besides the discomfort and nuisance factor, graphite often partially fills some of the half-tone dots on the matrix and in general hinders the attainment of faithful reproduction. The second method, i. e., the use of lead, is used where more accuracy and greater fidelity of reproduction is desired than can be obtained by wax. The lead matrix is formed from a lead sheet which is subjected to relatively high pressure on the original pattern plate by a hydraulic press. Obviously, due to this high pressure necessary, only original patterns which will not be distorted or damaged by such high pressure can be used. Type forms and wood-mounted cuts cannot be used for the reason that they cannot withstand such required high pressures. In the lead sheet method the lead matrix cannot be easily removed from the printing plate pattern after molding and this often results in bending or distorting the lead matrix. Both the wax method and the lead sheet method have the objection that only one electrotype can be made, the detail of the matrix being destroyed in removing the electroplated replica. The third and more recent method of using plastic sheets overcomes most of the objections hereinbefore noted in the wax and lead sheet methods. This last method consists mainly in pre-heating a plastic sheet, the placement of the sheet in contact with the original type form or printing plate, applying a resilient blanket over the thermoplastic sheet, placing the original type form, thermoplastic sheet and resilient blanket between the platens of a large and powerful press, applying pressure sufficient to form the matrix while the plastic sheet is still soft, maintaining this pressure until the plastic material has cooled and set, removing the assembled members from the press and separating the matrix from the original printing plate, the rendering of the thermoplastic matrix electro-conductive (accomplished usually by spraying a layer of silver or other metallic material thereon), the placement of the matrix in an electro-plating bath and plating with copper or other suitable metal to the desired thickness, the removal of the metal shell from the matrix, the application of a suitable liquid flux to the back of the metal shell after which a layer of solder or tinfoil is placed on the back of the same and melted, and finally the pouring of electrotype backing metal over the back of the shell to produce the desired thickness, after which the same is allowed to cool and solidify.

By the use of plastic sheets, many advantages accrue, some of which are as follows:

1. No graphite or other releasing agent is required during the process inasmuch as there is no sticking between the original type form and the matrix.

2. The "cutting down," "building up," and "flashing" necessary in wax molding is eliminated.

3. The thermoplastic sheet in combination with the resilient blanket, permits the matrix to be molded by extrusion and bending rather than by displacement as in the case of wax.

4. The objectionable "slides" often encountered in wax molding is entirely eliminated. Also, since the thermoplastic material is elastic when set, there is no tendency for any portion of the matrix to lift when releasing the original after molding, thus eliminating distortions.

5. Pressures required in the molding process are lower than those required for wax and lead molding, thus eliminating possible damage to the original printing plates.

6. The plastic matrix can be used to make any number of replicas of the original pattern. That is, when rendered electro-conductive and subsequently electroplated to give a replica of the pattern, the replica can be easily separated from the matrix without damage to the matrix so that the matrix can be rendered electro-conductive again and again. Only one replica can be made from a lead or wax matrix. Obviously, when many duplicates are desired such as in production runs and when different colors are desired in the finished print, the thermoplastic sheet is the answer.

While the method of using plastic sheets in electrotyping has definite advantages over the wax and lead method, certain cost and production problems have arisen and it is to the solving of these that I apply my method of and means for forming thermoplastic molds for use in electrotyping.

Referring to the drawings, I have used the numeral 10 to designate a supporting member having a horizontal flat top 11. The numeral 12 designates a movable supporting bed longitudinally slidably mounted on the top of the member 11. The numeral 13 designates a longitudinal gear rack on the upper side marginal edge of the member 12. The numerals 14 and 15 designate two bearing members secured to the center sides of the member 10 and extending upwardly to a plane above the member 12, as shown in Fig. 2. The numeral 16 designates a shaft journaled in the upper ends of the two bearing members 14 and 15 and extending above and transversely of the longitudinal axis of the member 10. The numeral 17 designates a spur gear rigidly secured to the shaft 16 and in engagement with the teeth of the rack 13. The numeral 18 designates a cylinder rigidly secured on and to the shaft 16 and positioned between the two bearing members 14 and 15. The numeral 19 designates layers of suitable resilient material around the cylinder 18. These members 19 should be heat resistant and may be of such material as cork, heat-resistant rubber, or like. The numeral 20 designates a housing above the member 10 and to the right side of the cylinder 18, as shown in Fig. 1. This housing has an entrance opening 21 at its lower right end and its other end adjacent the cylinder 18 is open. The numeral 22 designates a similar housing above the member 10 and to the left of the cylinder 18. This housing has an exit opening 23 in its lower left end and is open at its end adjacent the cylinder 18. The numeral 24 designates a pipe terminating inside the housing 22 and designed to be in communication with a source of cool air under pressure. The numeral 25 designates electric resistance wires positioned directly below the top 12 and in a plane directly below the housing 20. When the device is operating these electrically heated elements are designed to be in electrical communication with a source of electrical energy.

The numeral 26 designates electric resistance wires or other suitable type of electrically heated elements inside the cylinder 18. When the device is functioning these units 26 are designed to be in communication with a source of electrical energy by any suitable means such as the usual carbon contact brushes and wires 27 commonly used in connecting electric power to rotating equipment. The numeral 28 designates an original plate pattern resting on the bed 12. The numeral 29 designates a thin sheet of thermoplastic material. This sheet is made of thermoplastic resin or other suitable plastic material capable of being softened by application of heat and of being subsequently hardened again by cooling. Vinyl acetate-vinyl chloride material is excellent for this use because it has dimensional stability and will not shrink after the impression of the pattern is made therein. Furthermore, such material will not warp nor absorb moisture in the subsequent operation of making it electro-conductive. By my process these sheets may be very thin, thereby minimizing the cost. The numeral 30 designates any suitable prime mover operatively connected to the shaft 16 for rotating the cylinder 18 and gear 17 at times.

From the foregoing, it will be seen that my device is relatively inexpensive inasmuch as its chief parts consist merely of a slidable bed, rotatable heated cylinder above the same, a heated housing in advance of the roller, and a cooling chamber at the other side of the roller. To form a mold or casing it is merely necessary to place a plastic sheet over the original pattern, and place the same on the bed 12 by insertion through the receiving opening 21. Due to the heat from the electric elements 25 the plastic sheet material now inside the heating compartment 20 will readily become warm and pliable.

By causing the shaft 16 to rotate the bed will move under the cylinder 18 with the cylinder rolling with the bed and with the original pattern and plastic sheet being tightly pressed between the bed and the cylinder. As the bed moves to the left and the under side of the cylinder rotating in the same direction the resilient covering of the cylinder will force, by roll press action, the now pliable plastic sheet downwardly, over, and around the indicia and character strokes of the original pattern. This rolling pressure action is much quicker and produces a better result by roll pressing the plastic into the character grooves than could possibly be obtained from a large costly vertical press. As the cylinder is heated by the electric heating elements 26 the heating and pressing of the plastic sheet onto the pattern will be accomplished automatically and simultaneously. As the bed carries the pattern and plastic mold from under the cylinder press it passes into the cooling chamber 22. The plastic mold is cooled on the pattern before its removal in order that there will be no shrinkage when the mold is removed from the pattern. After the pattern and plastic mold is sufficiently cooled within the compartment 22 the same is removed from the exit opening 23. It is after the pattern and mold passes from my machine that the mold is removed and processed for obtaining metallic impressions in the usual manner and as heretofore explained. It will be found that a mold from my equipment will be excellent in every detail. When straight vertical presses are used air locks, air bubbles, and like are frequently experienced between the mold and the pattern, thereby causing a defective mold. By roll pressing the plastic sheet onto the pattern air locks or bubbles are eliminated, the forming of a mold is easily and quickly accomplished, and the roll press equipment is most economical in manufacture.

With the use of certain thermoplastic sheet material and in certain operations it is not necessary to employ the heating units 25 inasmuch as the heated cylinder will be sufficient to render the matrix pliable. Also, in certain operations it may be desirable to merely use the heating units 25 and not the heating units 26. If desired, a resilient blanket similar to the material 19 may be placed on top of the thermoplastic sheet and the same may be used separately or in combination with the resilient material 19 around the cylinder. Also, the use of flat blankets over the thermoplastic sheet may be desirable when it is necessary to gain additional downward pressure from the roller onto the matrix. This can also be accomplished by placing suitable sheets or strips between the pattern 28 and bed 12.

Although I have described my device and method as particularly adapted to the rapid and economical production of thermoplastic molds, it can also be used for other purposes in the art, such as the making of all types of matrix and also for the rectification of type form. As is well known in the art, this latter process consists in using the thermoplastic sheet back of the type form, forcing the type form downwardly and into the plastic sheet so that all of the characters are of the same height, permitting the plastic sheet to cool and leaving it permanently as a backing member.

In some productions it may be desirable to free the cylinder 18 from operative engagement with the bed 12 and vice versa in order that one or the other only will be connected to the prime mover. Any suitable means may be used for disconnecting the cylinder 18 from positive movement with the shaft 16 such as by a key, as shown in Fig. 2. To render the bed free of engagement with the gear 17 it is merely necessary to remove the bed and insert it back into place with the gear rack 13 to the right side of the device opposite from the gear 17.

Some changes may be made in the construction and arrangement of my improved method of and means for forming thermoplastic molds for use in electrotyping without departing from the real spirit and purpose of my invention, and it is my intention to cover by my claims any modified forms of structure or use of mechanical equivalents which may be reasonably included within their scope.

I claim:

1. In a device of the class described, a supporting table, a bed slidably mounted on said supporting table, a means for heating said bed, a cylindrical press rotatably mounted on said supporting table and above said bed, a means for heating the inside of said cylindrical press, and an air pipe at one side of said cylindrical press designed to be in communication with a source of air under pressure at times.

2. In a device of the class described, a supporting table, two spaced apart compartments on said table, a means for heating one of said compartments, a means for cooling the other said compartment, a bed slidably mounted on said supporting table and capable of being moved into either of said compartments, a cylindrical press rotatably mounted and on said supporting table, above said bed and between said two compartments, and a means for heating the inside of said cylindrical press.

3. In a device of the class described, a supporting table, two spaced apart compartments on said table, a means for heating one of said compartments, a means for cooling the other said compartment, a bed slidably mounted on said supporting table and capable of being moved into either of said compartments, and a cylindrical press rotatably mounted and on said supporting table, above said bed and between said two compartments.

ROBERT R. MYERS.

REFERENCES CITED

The following references are of record in the file of this patent:

UNITED STATES PATENTS

| Number | Name | Date |
|---|---|---|
| 835,522 | Higgins | Nov. 13, 1906 |
| 1,379,434 | Yeoell | May 24, 1921 |
| 1,915,384 | Reilly et al. | June 27, 1933 |
| 1,988,094 | Stimpson et al. | Jan. 15, 1935 |
| 2,015,445 | Bierer et al. | Sept. 24, 1935 |
| 2,075,636 | Browne | Mar. 30, 1937 |
| 2,219,158 | Van Benschoten | Oct. 22, 1940 |
| 2,334,233 | Wood | Nov. 16, 1943 |
| 2,400,518 | Kreber et al. | May 21, 1946 |